Nov. 21, 1950     L. C. HUCK     2,531,049
FASTENING DEVICE
Filed March 8, 1949
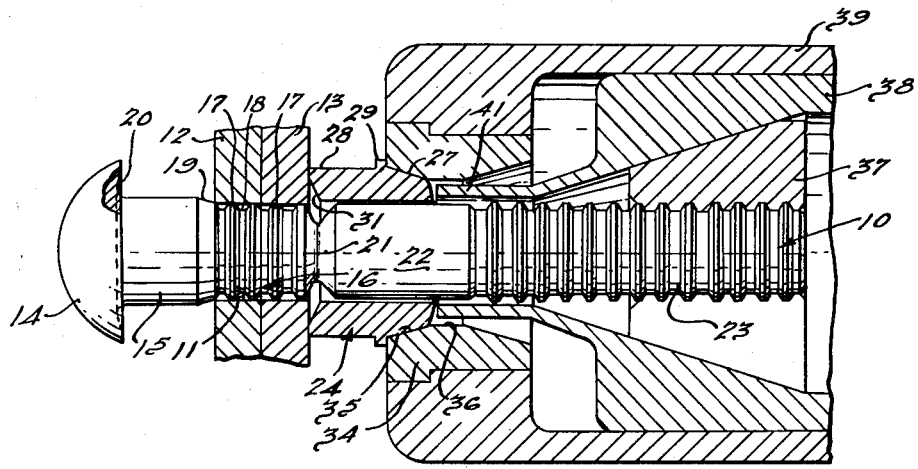
FIG. 1.
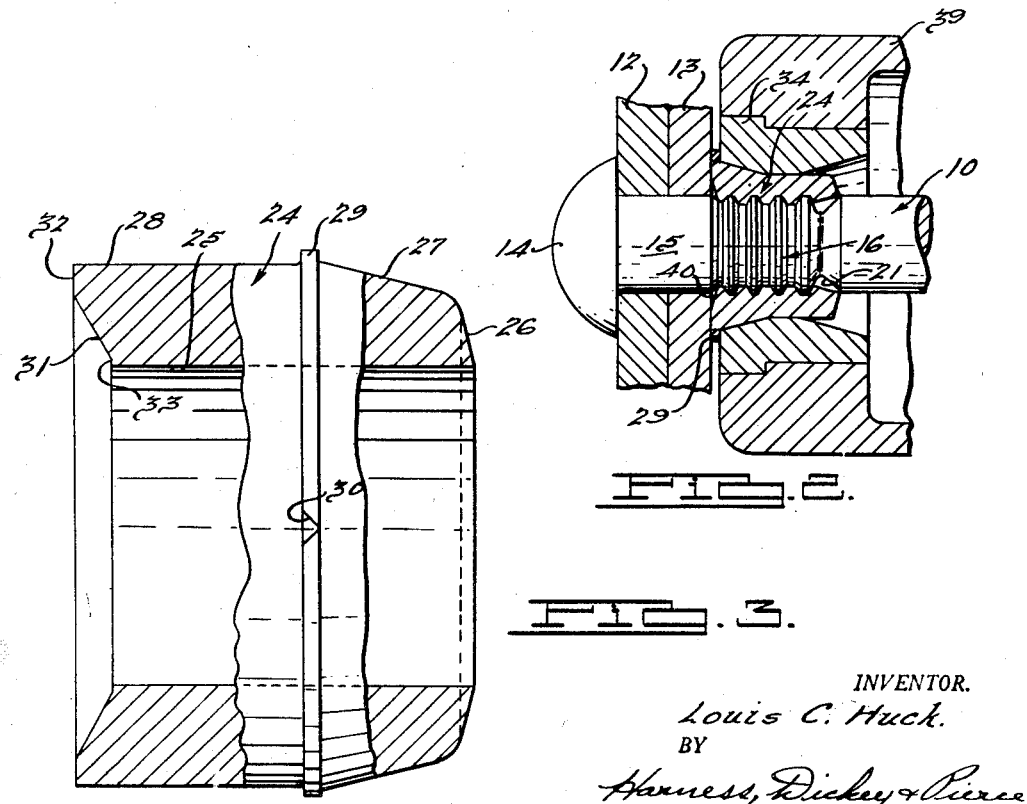
FIG. 2.
FIG. 3.
INVENTOR.
Louis C. Huck.
BY
Harness, Dickey & Pierce
ATTORNEYS.

Patented Nov. 21, 1950

2,531,049

UNITED STATES PATENT OFFICE 2,531,049

FASTENING DEVICE

Louis C. Huck, Grosse Pointe, Mich., assignor to Huck Manufacturing Company, Detroit, Mich., a corporation of Michigan Application March 8, 1949, Serial No. 80,183

3 Claims. (Cl. 85—5)

The present invention relates to improvements in fastening devices, and particularly to improvements in rivets and bolts of the type disclosed in the co-pending application of Louis C. Huck, Serial No. 638,081, filed December 29, 1947.

In general, the present invention comprises a two-part fastener including a pin or bolt having a preformed head adapted to be inserted from one side of the work, and a collar adapted to be inserted over the pin at the opposite side of the work and thereafter clinched to the pin. The work usually comprises, for example, a pair of plate or panel members having aligned openings therein through which the pin extends. The head engages the outside surface of one of the panels, and the collar engages the outside surface of the other panel. The fastener is set by pulling the pin and applying the reaction force to the collar; and after a certain pulling force is reached, the collar is locked to the pin by flowing metal into locking grooves in the pin. During the initial or primary clinching operation, the panels are pulled tightly together with free relative motion between the pin and collar. Interference fit plus bringing the sheets into intimate contact must be accomplished by the primary clinch, i. e., before motion of the anvil has caused sufficient swedging to bring the I. D. of the collar into engagement with the locking lands which define the locking grooves of the pin. At the end of the primary clinch, i. e., at the point when the collar has been swaged into initial contact with the pin, relative free movement between the pin and collar stops. Thereafter, secondary clinch starts and becomes progressively greater as the swaging of the collar into the lock grooves continues.

During this secondary clinch that part of the collar which has been swedged elongates and the reaction force may build up to a point that the tensile stress on the pin is sufficient to break the pin in tension at one of the locking grooves, usually the one closest to the head. The relief on the collar, according to the present invention, prevents breaking of the pin, as well as rupture of the locks that have been swaged.

The present invention is concerned primarily with an improved construction that reduces to a minimum the possibility of the pin breaking at one of the locking grooves or rupture of the locks that have been swaged due to this elongation of the collar during the secondary clinch.

One of the primary objects of the present invention is to provide an improved fastener of the type mentioned which is so constructed that the tendency of the pin to break in the locking groove section is reduced to a minimum.

A further object of the invention is to provide an improved collar in fasteners of the type mentioned, which collar is so constructed that the tendency of the pin to break in the locking groove sections is reduced to a minimum.

A further object of the invention is to provide an improved collar and fastener of the type mentioned which compensates for the lengthening of the part of the collar that has swedged by permitting shortening of the unswedged part of the collar, and thus prevents breaking of the pin in the locking groove section or rupture of the locks that have been swedged.

A further object of the invention is to provide an improved collar in fasteners of the type mentioned in which weakened points are provided in the collar flange which facilitates removal of the sheared-off flange.

Other objects of the invention will become apparent from the following specification, the drawing relating thereto, and from the claims hereinafter set forth.

In the drawing in which like numerals are used to designate like parts in the several views throughout:

Figure 1 is a cross-sectional view illustrating a fastener assembled with the work prior to the setting operation in accordance with the present invention;

Figure 2 is a partial view, similar to Fig. 1, but illustrating the fastener at the completion of the setting operation but before the final breaking of the pin; and Figure 3 is an enlarged cross-sectional view with parts in elevation of the improved collar of the present invention.

Referring to the drawing, the pin or locking bolt is generally indicated at 10 and is shown as extending through aligned openings 11 in a pair of plates or panels 12 and 13. The plates or panels may be of metal, such as steel or aluminum. The pin 10 has an integral head 14 adapted to engage the adjacent face of panel 12 with the body portion of the pin adapted to pass through the aligned openings 11. The pin 10 also includes a cylindrical hole-filling portion 15 adjacent the head, and a grooved portion 16 adjacent portion 15. The groove portion 16 comprises a series of annular ribs 17 with grooved bottoms 18 therebetween. The outer diameter of the ribs is less than the outer diameter of the hole-filling portion 15; and, between the latter portion and the grooved portion 16, the shank has a conical taper or shoulder 19. It is desirable to use the fastener in structural openings smaller than the diameter of the hole-filling portion 15, but the openings 11 should be slightly larger than the ribs 17 so that the pin may be easily inserted. Therefore, when the pin is manually inserted the hole-filling portion 15 will not enter the openings 11 and the pin is initially in the position shown in Fig. 1.

Head 14 is preferably formed with an annular undercut or recess 20 which is formed in the face directed toward the work so as to provide a space to accommodate burrs or pucker due to interference fit which may be present at the edge of opening 11 in plate 12.

At the end of the grooved portion 16 of the pin, remote from the head 14, the pin has a groove or breakneck 21 of reduced diameter, and this point represents the weakest part of the pin so that the pin will break under tension at this point before it will break under tension at any other point. Next to the breakneck 21, the pin has a cylindrical portion 22 of substantial length which may be of slightly reduced diameter as compared to ribs 17, and this portion terminates at its outer end in a grooved or gripping portion 23.

The second part of the fastener comprises a collar or head, generally indicated at 24, which is adapted to be received over the end (right-hand viewing Fig. 1) of the pin and is located against the adjacent face of plate 13, as shown. This collar is adapted to be swaged or contracted radially inwardly into the grooves 18 of the pin so as to lock the collar thereto and to form a head against the plate in the completed operation.

Referring particularly to Figs. 1 and 3, the collar is illustrated in its initial form; that is, its form before it is locked to the pin. In its initial form, the collar is formed with a cylindrical opening 25 therethrough which is adapted to receive the pin. That portion of the collar remote from the work in the setting position is formed with a first frusto-conical portion 26 which joins through a radius with another frusto-conical portion 27. The outer periphery of the collar at the opposite end is formed with a cylindrical portion 28 which has a diameter substantially the same as the greatest diameter of the frusto-conical portion 27. In the embodiment here illlustrated, an annular flange 29 is provided between portions 27 and 28 which extends radially beyond the periphery of portion 28.

The flange 29 is preferably weakened by the provision of a notch or notches 30 through one of the radial faces thereof, and preferably there are two such notches at diametrically opposed points, but one or more may be sufficient or required. The purpose of the notch 30 is to facilitate removal of the flange 29 after it is forced over the end of the collar during the setting operation by weakening the sheared-off flange so that it will either break when forced down over the collar; or, if still intact, can be easily broken for removal from the collar.

The opening 25 in the collar is slightly larger than the ribs 17 and portion 22 of the pin, to provide a desirable clearance which allows slight collar contraction without interfering with the axial motion of the pin.

As mentioned above, during the secondary clinch, elongation of the collar 24 may cause the pin to break in tension at one of the lock grooves 18, or may cause rupture of the locks that have been swaged. In order to prevent this happening, according to the present invention that face of the collar adjacent the work, or facing the head 14, is formed with a bevel or relief 31. In the specific embodiment illustrated, the bevel 31 is formed on only a portion of that face and joins with an annular radial surface 32 adjacent the outer periphery of the collar and an annular radial surface 33 adjacent the inner periphery of the collar. The manner in which this relief or bevel permits this elongation without premature breaking of the pin will be more apparent after the description of the operation.

The fastener is set by means of riveting mechanism of the type embodied in Huck Patent No. 2,114,493, and a portion of such mechanism is shown in Figs. 1 and 2 for purpose of illustration. Such mechanism comprises an anvil 34 having a frusto-conical portion 35 which is substantially complementary to the frusto-conical portion 27 on the collar. At its smaller end the surface 35 joins a short cylindrical bore 36 and the length of such cylindrical surface is such as not to provide an undesired frictional resistance to extrusion of the collar through the anvil by provision of the relief back of the swaging land.

In order to grip the grooved portion 23 of the pin, jaws 37 are provided which are adapted to be contracted and moved by a jaw-contracting and moving sleeve element 38. When the jaws 37 and member 38 move to the right so as to pull the pin, the reaction to any pull is applied through a barrel or sleeve 39 and then through the anvil 34 which is mounted in the sleeve 39. After the pin is inserted through aligned openings 11 in plates 12 and 13, as shown in Fig. 1, the collar 24 is placed over the pin and the riveting mechanism is applied over the pin until the grooved end portion 23 is gripped between jaws 37. Initial operation of the mechanism causes the pin to be pulled and the flared mouth portion 35 of the anvil to move into contact with the conical portion 27 on the collar so as to press the collar against plate 13.

With the collar against plate 13, and the jaws gripping the pin, further pull on the pin will cause the hole-filling portion 15 to wire draw down to a smaller diameter, or expand the hole, or a combination of both, as the pin moves into and through openings 11 in the plates, and this continues until the head 14 bears against the adjacent face of plate 12. It is to be realized that depending upon the relative hardness of the metals involved the hole-filling portion of the pin may more or less wire draw down to a smaller diameter and the openings may more or less expand accordingly. Under certain conditions it is desirable that the hole-filling portion of the pin have an interference fit in the opening; or, in other words, the fit be such as caused by one interfering metal giving way to the other. Under other conditions, an interference fit may not be necessary or desirable. During the foregoing procedure, the plates are pulled together, if separated, since the collar is being pressed against plate 13 while the hole-filling portion 15 is applying force against plate 12. If resistance to wire-drawing of the pin, or to expansion of the hole, or to a combination of both, is insufficient to bring the plates together, additional force to accomplish this purpose will result when the head of the pin contacts plate 12.

When the riveting mechanism is actuated to pull the pin and apply the reaction to the collar 24, the anvil surface 35 will tend to move over tapered portion 27 of the collar and the end of the collar 27 will tend to extrude through the central opening 36 of the anvil.

The extent of early movement of the anvil over the collar depends upon resistance to swedging of the collar. Movement of the anvil over the collar should not exist to any appreciable extent until the completion of interference fit and drawing together of sheets with pressure. At the point when the collar has been swaged into initial contact with the pin, relative free movement between the collar and pin stops and this is the completion of primary clinch.

After the primary clinch, and after the force on the anvil is sufficient to overcome the high initial resistance of the collar 24 to swaging, the anvil moves over surface 27 and shears off flange 29, which is caused to move over cylindrical portion 28. Variation in the high initial resistance to swaging may be varied by varying the thickness of the flange 29.

This swaging of the collar causes a flow of metal into the locking portion 16, as shown in Fig. 2, and during this swaging that part of the collar that has been swedged lengthens or elongates which results in what has been defined as secondary clinch. The swaging will continue as the anvil moves over cylindrical portion 28 and the flange 29 will be moved therealong to a position against plate 13. The notches 30 will permit breaking of the annular flange so that when the anvil is removed the flange can be easily removed from the completed work.

As mentioned above, elongation of the collar 24 causes the secondary clinch, which is superimposed on and added to the primary clinch. The forces caused by this elongation are relieved by the bevel 31 so that the pin 10 will not prematurely break. The bevel 31 will assume different forms in the final shape of the collar, depending upon the material of the pin, and therefore its strength, the hardness of the collar material, and also the hardness and surface condition of the material being fastened.

After the lock is completed between the collar and the pin, increased pull on the pin will break it at the breakneck 21, and thereafter operation of the mechanism is reversed so as to cause nose 41 on the sleeve 38 to eject the collar from the anvil.

In the embodiment specifically illustrated, the flange 29 is provided on the collar 24, but this flange may be eliminated and the benefits of the bevel or relief 31 will still be present with respect to elimination of the tendency of the pin to break in the locking groove sections or rupture of the locks that have been swaged.

Formal changes may be made in the specific embodiment of the invention described without departing from the spirit and scope of the appended claims.

What is claimed is:

1. A fastener for use in attaching together a plurality of members having aligned openings comprising a pin having a head for engaging the outer side of one member, said pin having a cylindrical portion axially next to the head and adapted to extend through the openings to engage the walls thereof, an externally and circumferentially grooved portion next to the cylindrical portion and adapted to be located substantially at the outer side of the other member, a stem portion at the end opposite the head for enabling gripping and pulling the pin, an annular breakneck between said grooved portion and the stem portion, and a collar disposable on the pin over the stem end and in embraceable relation with said pin and adapted to be swedged into the grooves when the fastener is set by pulling the pin, said collar having a substantially uniform internal diameter substantially that of said opening, the end portion of the collar facing the head being of decreasing cross-sectional area toward the head and being relatively weaker to axial compression than the remaining portion of the collar when the collar is being swedged.

2. A fastener for use in attaching together a plurality of members having aligned openings comprising a pin having a head for engaging the outer side of one member, said pin having a cylindrical portion axially next to the head and adapted to extend through the openings to engage the walls thereof, an externally and circumferentially grooved portion next to the cylindrical portion and adapted to be located substantially at the outer side of the other member, a stem portion at the end opposite the head for enabling gripping and pulling the pin, an annular breakneck between said grooved portion and the stem portion, and a collar disposable on the pin over the stem end and in embraceable relation with said pin and adapted to be swedged into the grooves when the fastener is set by pulling the pin, said collar having a substantially uniform internal diameter substantially that of said opening, the end portion of the collar facing the head having a bevel extending inwardly toward the axis of the collar and toward the opposite end of the collar, said beveled end being relatively weaker to axial compression than the remaining portion of the collar when the collar is being swedged.

3. A fastener for use in attaching together a plurality of members having aligned openings comprising a pin having a head for engaging the outer side of one member, said pin having a cylindrical portion axially next to the head and adapted to extend through the openings to engage the walls thereof, an externally and circumferentially grooved portion next to the cylindrical portion and adapted to be located substantially at the outer side of the other member, a stem portion at the end opposite the head for enabling gripping and pulling the pin, an annular breakneck between said grooved portion and the stem portion, and a collar disposable on the pin over the stem end and in embraceable relation with said pin and adapted to be swedged into the grooves when the fastener is set by pulling the pin, said collar having a substantially uniform internal diameter substantially that of said opening, the end portion of the collar facing the head being of gradually decreasing cross-sectional area toward the head and being relatively weaker to axial compression than the remaining portion of the collar when the collar is being swedged, the opposite peripheral end portion being frusto-conical.

LOUIS C. HUCK.

REFERENCES CITED

The following references are of record in the file of this patent:

UNITED STATES PATENTS

| Number | Name | Date |
| --- | --- | --- |
| 1,167,572 | Kerr et al. | Jan. 11, 1916 |
| 1,406,065 | Norwood | Feb. 7, 1922 |
| 2,001,290 | Thomson | May 14, 1935 |
| 2,298,203 | Eklund | Oct. 6, 1942 |
| 2,397,076 | Keller et al. | Mar. 19, 1946 |